United States Patent
Yang

(10) Patent No.: US 11,086,965 B2
(45) Date of Patent: Aug. 10, 2021

(54) RECORDING LEDGER DATA ON A BLOCKCHAIN

(71) Applicant: Advanced New Technologies Co., Ltd., Grand Cayman (KY)

(72) Inventor: Xinying Yang, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 17/160,674

(22) Filed: Jan. 28, 2021

(65) Prior Publication Data

US 2021/0149974 A1 May 20, 2021

Related U.S. Application Data

(63) Continuation of application No. PCT/CN2019/116010, filed on Nov. 6, 2019.

(30) Foreign Application Priority Data

Dec. 28, 2018 (CN) .......................... 201811621459.8

(51) Int. Cl.
*H04L 29/06* (2006.01)
*G06F 16/958* (2019.01)
*H04L 9/06* (2006.01)

(52) U.S. Cl.
CPC .......... *G06F 16/958* (2019.01); *H04L 9/0618* (2013.01); *H04L 9/0643* (2013.01); *H04L 2209/38* (2013.01)

(58) Field of Classification Search
CPC ........ G06F 16/958; G06F 21/57; G06F 21/64; H04L 9/0618; H04L 9/0643;
(Continued)

(56) References Cited

U.S. PATENT DOCUMENTS

| | | | |
|---|---|---|---|
| 10,454,689 B1* | 10/2019 | Sharifi Mehr | H04L 63/166 |
| 2009/0182653 A1* | 7/2009 | Zimiles | G06Q 10/10 |
| | | | 705/30 |

(Continued)

FOREIGN PATENT DOCUMENTS

| | | |
|---|---|---|
| CN | 108512653 | 9/2018 |
| CN | 108900364 | 11/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Malcolm Cribbs
(74) *Attorney, Agent, or Firm* — Fish & Richardson P.C.

(57) ABSTRACT

This disclosure relates to recording blockchain ledger data. In one aspect, a method includes capturing, by a first evidence-capturing node of multiple evidence-capturing nodes of a blockchain network comprising multiple nodes, network evidence from a target evidence source. A first evidence hash of the captured network evidence is calculated. The first evidence hash is sent to other evidence-capturing nodes. Additional evidence hashes are received from the other evidence-capturing nodes. For each set of matching evidence hashes, an evidence hash group that includes the set of matching evidence hashes is generated. A count number of evidence hashes in the evidence hash group is determined for each evidence hash group. A given evidence hash group having a largest count number is identified. A given evidence hash corresponding to the matching evidence hashes of the given evidence hash group is determined as a trusted evidence hash.

24 Claims, 5 Drawing Sheets

(58) Field of Classification Search
CPC ... H04L 2209/38; H04L 63/12; H04L 63/123; H04L 63/126
See application file for complete search history.

(56) References Cited

U.S. PATENT DOCUMENTS

| | | |
|---|---|---|
| 2010/0034470 A1 | 2/2010 | Valencia-Compo et al. |
| 2018/0101701 A1 | 4/2018 | Barinov et al. |
| 2019/0019135 A1* | 1/2019 | Vij ..................... G06Q 10/083 |
| 2020/0117690 A1* | 4/2020 | Tran ..................... G10L 15/26 |
| 2020/0134760 A1* | 4/2020 | Messerges ............ G06F 16/27 |
| 2020/0357086 A1* | 11/2020 | Yang ................... G06F 16/325 |
| 2020/0396059 A1* | 12/2020 | Micali ................... H04L 9/085 |

FOREIGN PATENT DOCUMENTS

| | | | |
|---|---|---|---|
| CN | 108920966 | | 11/2018 |
| CN | 108959416 | | 12/2018 |
| CN | 108959416 A | * | 12/2018 |
| CN | 110046994 | | 7/2019 |
| TW | 201828211 | | 8/2018 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2019/116010, dated Dec. 31, 2019, 10 pages (with partial English translation).
EP Extended Search Report in European Application No. 19906401.5, dated Jun. 24, 2021, 5 pages.

* cited by examiner

RECORDING LEDGER DATA ON A BLOCKCHAIN

CROSS-REFERENCE TO RELATED APPLICATIONS

This application is a continuation of PCT Application No. PCT/CN2019/116010, filed on Nov. 6, 2019, which claims priority to Chinese Patent Application No. 201811621459.8, filed on Dec. 28, 2018, and each application is hereby incorporated by reference in its entirety.

TECHNICAL FIELD

Embodiments of the present specification relate to information technology, and in particular to methods and systems for recording ledger data on a blockchain.

BACKGROUND

With the development of blockchain technology, blockchain-based network evidence storage has become popular.

Specifically, for network evidence (such as a webpage on the Internet) to be stored, a node in the blockchain network is generally used for capturing the network evidence, and then the node can calculate an evidence hash for the captured network evidence, and construct a ledger data based on the evidence hash. Then, the node, on the one hand, records the ledger data constructed by the node itself, and on the other hand, broadcasts the constructed ledger data to other nodes for recordation.

It should be noted that for each node in the blockchain network, the node recording the ledger data means that the node will cache the ledger data locally, so that only when the nodes are required to reach a consensus, the ledger data cached locally at each node can be packaged into a block, and then recorded as ledger data onto the blockchain.

However, in the existing technology, when only a single node in a consortium blockchain network is used for capturing network evidence and constructing the ledger data, the other nodes record the ledger data broadcast by the node and generally cannot verify whether the network evidence captured by the node is authentic.

SUMMARY

In order to alleviate the problem of the untrustworthiness of the nodes used for capturing network evidence in the blockchain network, the embodiments of the present specification provide methods and systems for recording blockchain ledger data, i.e., recording as ledger data on the blockchain. The technical solutions are as follows.

According to a first aspect of the embodiments of the present specification, a method is provided for recording blockchain ledger data, nodes of a blockchain network including a plurality of evidence-capturing nodes used for capturing network evidence, and the method including: for each of the evidence-capturing nodes, capturing network evidence from a target evidence source, and calculating an evidence hash of the captured network evidence; sending the calculated evidence hash to other evidence-capturing nodes, and receiving evidence hashes sent by other evidence-capturing nodes; gathering identical evidence hashes in all the obtained evidence hashes into the same group, and dividing different evidence hashes in all the obtained evidence hashes into different groups; counting a count number of evidence hashes in each of the groups, and determining an evidence hash in a group with a largest count number as a trusted evidence hash; and constructing ledger data based on the trusted evidence hash as determined and recording the ledger data.

According to a second aspect of the embodiments of the present specification, an apparatus is provided for recording blockchain ledger data, each node of a blockchain network including a plurality of evidence-capturing apparatus used for capturing network evidence, and the apparatus including: a capture-calculation module configured to capture network evidence from a target evidence source, and calculate an evidence hash of the captured network evidence; a sending-receiving module configured to send the calculated evidence hash to other evidence-capturing nodes, and receive evidence hashes sent by other evidence-capturing nodes; a dividing module configured to gather identical evidence hashes in all the obtained evidence hashes into the same group, and divide different evidence hashes in all the obtained evidence hashes into different groups; a counting-processing module configured to count a count number of evidence hashes in each of the groups, and determine an evidence hash in a group with a largest count number as a trusted evidence hash; and a recording module configured to construct a ledger data based on the trusted evidence hash as determined and record the ledger data.

According to a third aspect of the embodiments of the present specification, a blockchain system including a blockchain network is provided; wherein nodes of a blockchain network includes a plurality of evidence-capturing nodes used for capturing network evidence; each of the evidence-capturing nodes is configured to capture network evidence from a target evidence source, and calculate an evidence hash of the captured network evidence; send the calculated evidence hash to other evidence-capturing nodes, and receive evidence hashes sent by other evidence-capturing nodes; gather identical evidence hashes in all the obtained evidence hashes into the same group, and divide different evidence hashes in all the obtained evidence hashes into different groups; count a count number of evidence hashes in each of the groups, and determine an evidence hash in a group with a largest count number as a trusted evidence hash; and construct ledger data based on the trusted evidence hash as determined and record the ledger data.

In the technical solution provided by the embodiments of the present specification, a plurality of nodes in the blockchain network (referred to as evidence-capturing nodes herein) are used for capturing network evidence. After the plurality of evidence-capturing nodes have captured the network evidence, the evidence-capturing nodes will send one another evidence hash of the network evidence they have captured. Then, each evidence-capturing node will determine the evidence hash with the largest count number of among all the evidence hashes it has obtained (including the evidence hashes calculated by itself and the evidence hashes received by itself) as trusted evidence hash, construct ledger data based on the trusted evidence hash and record the ledger data.

Through the embodiments of the present specification, a plurality of evidence-capturing nodes in the blockchain network independently capture network evidence, and the version of the network evidence that has been captured the most times is regarded as the trusted version. Subsequently, the trusted version of the network evidence is stored. This is, instead of a certain node in the blockchain network determining the ledger data that the blockchain network is to record, the plurality of evidence-capturing nodes in the blockchain network now have to jointly determine the ledger data that the blockchain network needs to record. This can ensure the authenticity of the network evidence recorded as ledger data in the blockchain.

It is to be understood that the above general descriptions and the below detailed descriptions are merely illustrative and explanatory, and are not intended to limit embodiments of the present specification.

In addition, any of the embodiments of the present specification does not need to achieve all the above-mentioned effects.

BRIEF DESCRIPTION OF THE DRAWINGS

In order to more clearly describe the technical solutions in some embodiments of the present specification or the existing technology, the following will briefly introduce the drawings to be used in the description of the embodiments or the existing technology. Clearly, in the following description, the drawings are only some of the embodiments described in the present specification. For those ordinary skilled in the art, other drawings can be obtained based on these drawings.

DETAILED DESCRIPTION

Figure 1:
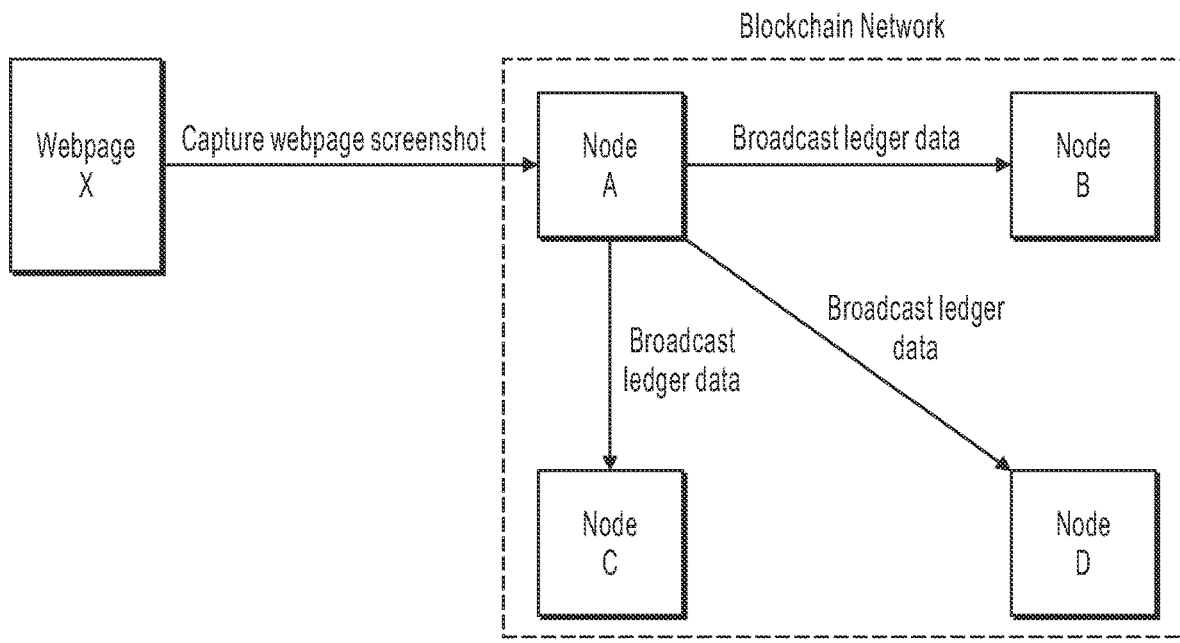
FIG. 1 is a schematic diagram illustrating a conventional implementation for recording blockchain ledger data.
Figure 2A:
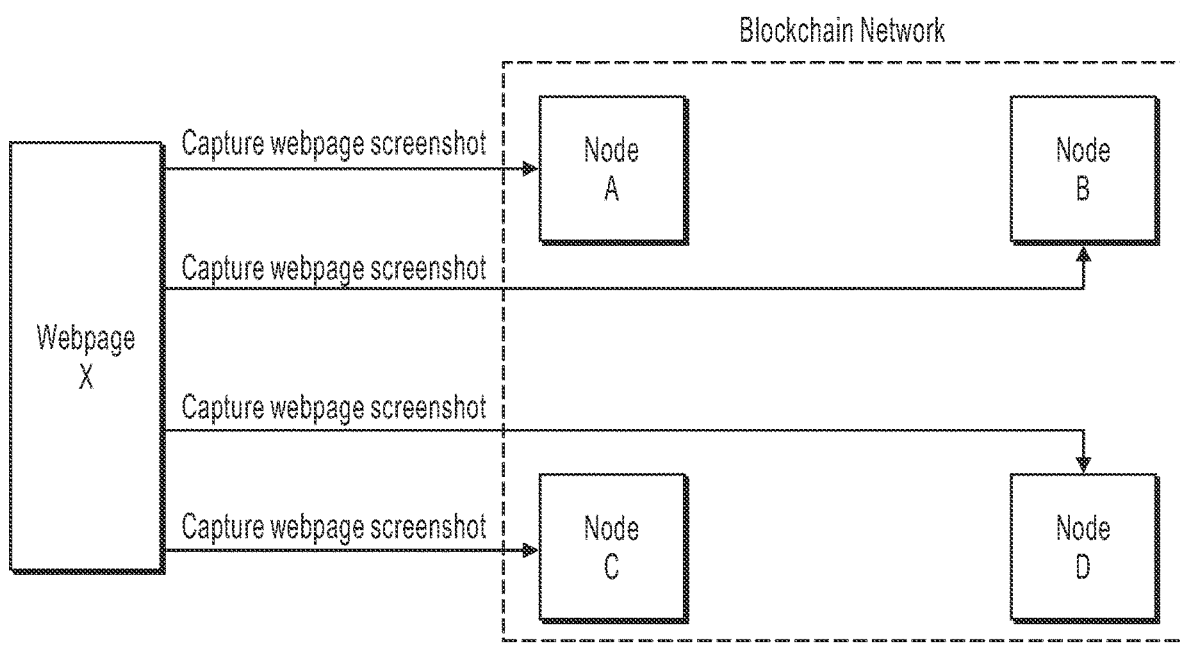
FIGS. 2A-2D are schematic diagrams illustrating a process of recording blockchain ledger data according to the embodiments of the present specification.
Figure 2B:
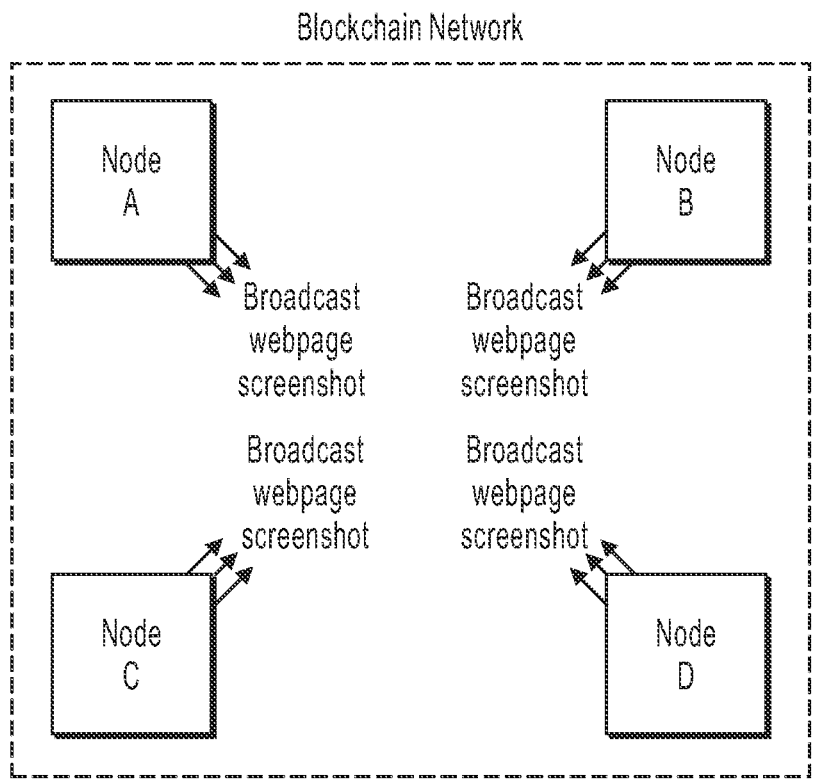
Figure 2C:
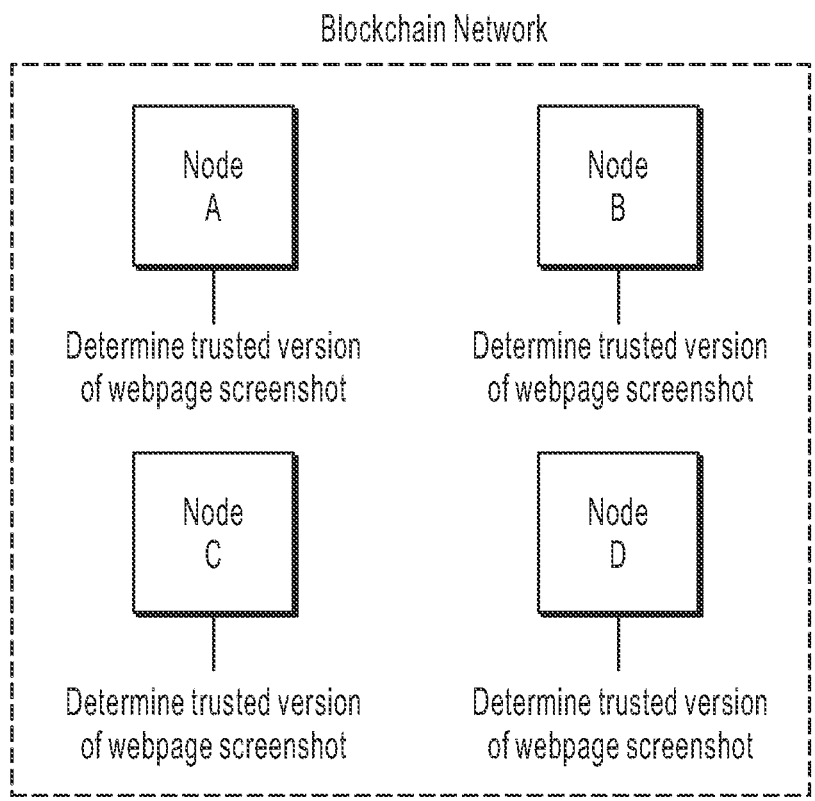
Figure 2D:
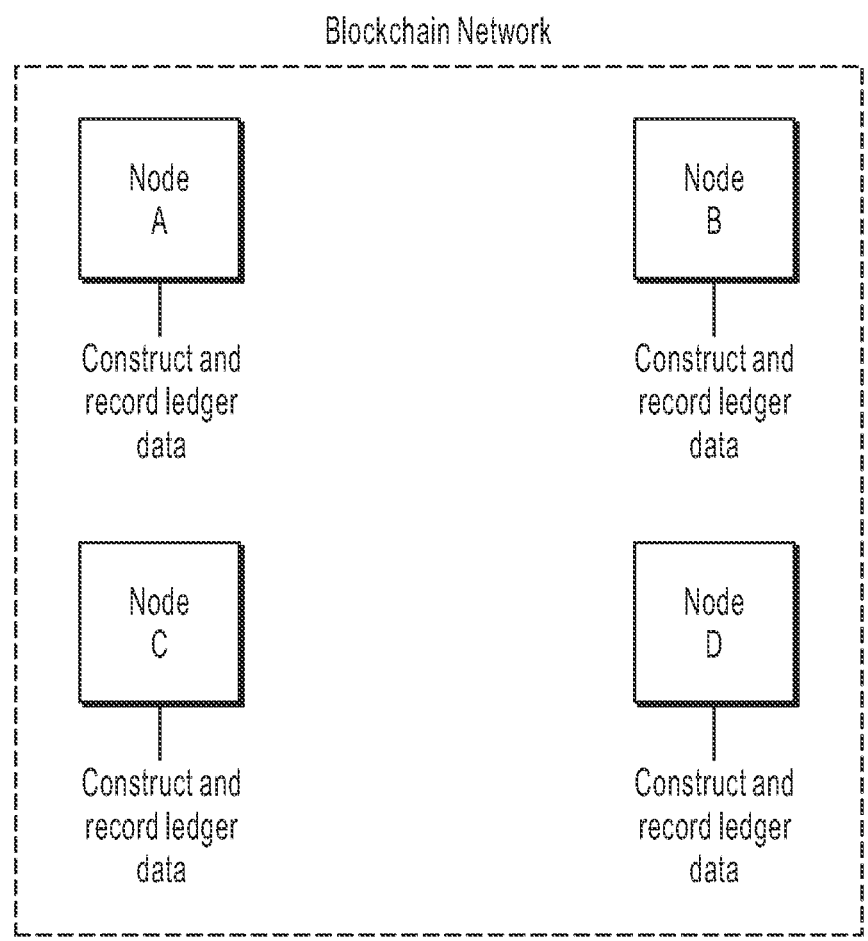

FIG. 1 is a schematic diagram illustrating a conventional implementation for recording a blockchain ledger data. As shown in FIG. 1, for a to-be-stored webpage, node A can access webpage X and capture a screenshot of webpage X. Then, node A constructs ledger data containing a hash value of the webpage screenshot based on the captured webpage screenshot. Then, node A, on the one hand, records the ledger data (that is, caches the ledger data), on the other hand, broadcasts the ledger data to nodes B-D, and nodes B-D will also cache the ledger data respectively. In a subsequent consensus stage, the cached transaction will be packaged into a block and recorded as ledger data on a blockchain by nodes A-D.

However, in practice, there is a possibility that node A accesses a wrong webpage (not webpage X, but webpage Y), or node A acts maliciously by intention, so that the screenshot of the webpage captured by node A is actually not a screenshot of webpage X. As a result, the hash value contained in the ledger data received by nodes B-D actually is not the hash value of the screenshot of webpage X, and the blockchain network does not actually store webpage X.

In some embodiments of the present specification, in order to avoid the above situation, a plurality of nodes in the blockchain network independently capture screenshots of the webpage, and then a screenshot version of the webpage supported by most nodes can be regarded as a trusted version. The ledger data recorded by the blockchain network is constructed based on the hash value of the trusted version of the webpage screenshot. FIGS. 2A-2D are schematic diagrams of a process of recording a blockchain ledger data according to embodiments of the present specification.

In order to enable those skilled in the art to better understand the technical solutions in some embodiments of the present specification, the technical solutions in some embodiments of the present specification will be described in detail below with reference to the drawings in some embodiments of the present specification. Clearly, the described embodiments are only a part of the embodiments in the present specification, rather than all the embodiments. Based on some embodiments in the present specification, all other embodiments obtained by a person of ordinary skill in the art should fall within the scope of protection.

The following describes in detail the technical solutions provided by the embodiments of the present specification with reference to the accompanying drawings.

Figure 3:
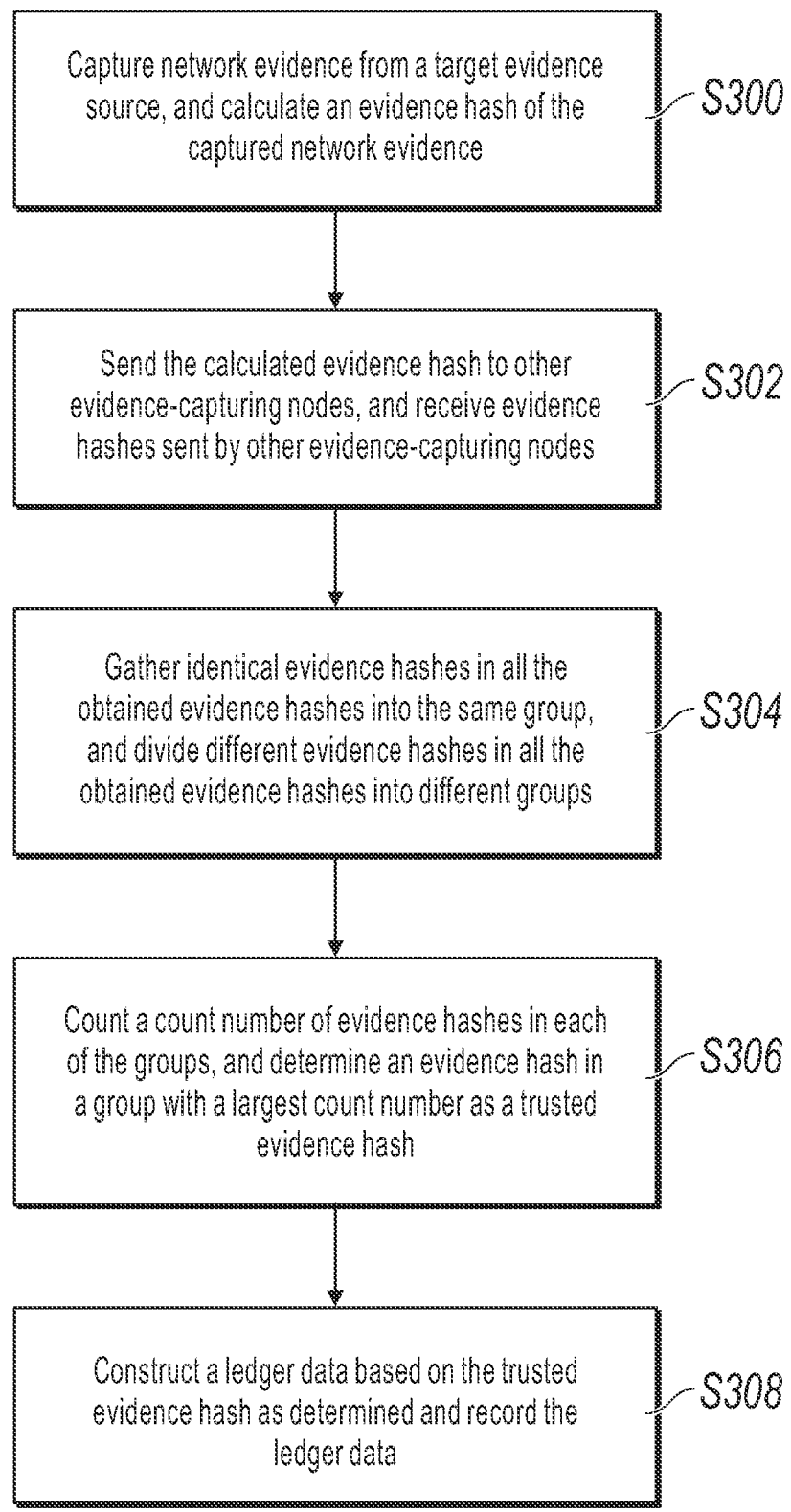
FIG. 3 is a schematic flowchart illustrating a method for recording blockchain ledger data according to an embodiment of the present specification.

FIG. 3 is a schematic flowchart illustrating a method for recording blockchain ledger data according to some embodiments of the present specification, including the following steps.

S300, for each evidence-capturing node, the evidence-capturing node captures network evidence from a target evidence source, and calculates an evidence hash of the captured network evidence.

In some embodiments of the present specification, the blockchain network can specifically be a consortium blockchain network. Nodes of the blockchain network include a plurality of evidence-capturing nodes used for capturing network evidence.

It should be noted that all the nodes in the blockchain network can be evidence-capturing nodes, or not all the nodes are evidence-capturing nodes. The number of evidence-capturing nodes is generally more than three.

In some embodiments of the present specification, the target evidence source refers to the source of the to-be-stored network evidence. For example, the target data source can be, or correspond to, a webpage address (referred to as a target webpage address herein). When a webpage at the target webpage address is required to be stored, a screenshot of the webpage at the target webpage address is the network evidence to be captured by the evidence-capturing node.

After the evidence-capturing node captures the network evidence from the target evidence source, the evidence-capturing node calculates a hash value of the captured network evidence (referred to as an evidence hash herein).

S302, the calculated evidence hash is sent to other evidence-capturing nodes, and evidence hashes sent by other evidence-capturing nodes are received.

In some embodiments of the present specification, each evidence-capturing node can capture a piece of network evidence, and the network evidence captured by the evidence-capturing nodes can be identical or different. Each evidence-capturing node sends the evidence hash of the network evidence captured by the evidence-capturing node to every other evidence-capturing node. Thereby, assuming that there are a number N of evidence-capturing nodes, then the count number of evidence hashes obtained by each evidence-capturing node is N.

In other words, in some embodiments of the present specification, all the evidence hashes obtained by each evidence-capturing node include the evidence hash calculated by the evidence-capturing node and the evidence hashes received by the evidence-capturing node.

S304, identical evidence hashes in all the obtained evidence hashes are gathered into the same group, and different evidence hashes in all the obtained evidence hashes are divided into different groups.

S306, a count number of evidence hashes in each of the groups is counted, and the evidence hash in the group with the largest count number is determined as a trusted evidence hash.

In some embodiments of the present specification, since faulty nodes or malicious nodes can be present in the evidence-capturing nodes, the pieces of network evidence captured by the evidence-capturing nodes from the target evidence source are not necessarily identical, and the evidence hashes calculated from the network evidence captured by the evidence-capturing nodes are not necessarily identical. The purpose of steps S304 and S306 is to gather the identical evidence hashes into the same group, and count the count numbers of the evidence hashes in each of the groups, so as to determine the evidence hash of a largest count number to be the trusted evidence hash.

The group with the largest count number refers to the group with the largest count number of evidence hashes.

S308: ledger data is constructed based on the trusted evidence hash as determined and is recorded, i.e., the trusted evidence hash, data derived from the trusted evidence hash, or both are recorded as ledger data on the blockchain.

After the trusted evidence hash is determined, each evidence-capturing node can respectively construct ledger data based on the trusted evidence hash and record the ledger data constructed by the evidence-capturing node itself.

In other words, in some embodiments of the present specification, there is generally no need to broadcast the constructed ledger data among the evidence-capturing nodes.

It should be noted that if not all nodes in the blockchain network are evidence-capturing nodes, in other words, the nodes of the blockchain network also include at least one non-evidence-capturing node, any evidence-capturing node can send the ledger data constructed by the evidence-capturing node itself to the non-evidence-capturing node for recordation. In this way, the ledger data recorded by each node in the blockchain network includes a trusted evidence hash.

Through the method shown in FIG. 3, a plurality of evidence-capturing nodes in the blockchain network independently capture network evidence, and the version of the network evidence that has been captured the most times is regarded as the trusted version.

Subsequently, the trusted version of the network evidence is stored. This is, instead of a certain node in the blockchain network determining the ledger data that the blockchain network is to record, the plurality of evidence-capturing nodes in the blockchain network now have to jointly determine the ledger data that the blockchain network needs to record. This can ensure the authenticity of the network evidence recorded as ledger data in the blockchain.

In addition, in some embodiments of the present specification, the condition for determining the trusted evidence hash can be more strictly limited.

Specifically, at step S306, only if the count number of evidence hashes contained in the group with the largest count number is greater than a first predetermined number, the evidence hash corresponding to the group with the largest count number is determined as a trusted evidence hash.

Further, conventional consensus algorithms (such as PBFT, RAFT, or the like) can be used for reference, so that even if there are a certain number of faulty and/or malicious nodes in the evidence-capturing nodes, a trusted evidence hash can be determined.

For example, the first predetermined number can be $(2N+1)/3$. That is, if there are N evidence-capturing nodes, even if there are $(N-1)/3$ faulty nodes and/or malicious nodes, as long as the network evidence captured by more than $(2N+1)/3$ evidence-capturing nodes is consistent with each other, it can be considered that the network evidence captured by the more than $(2N+1)/3$ evidence-capturing nodes is trusted.

For another example, the first predetermined number can be $(N+1)/2$. That is, if there are N evidence-capturing nodes, even if there are $(N-1)/2$ faulty nodes, as long as the network evidence captured by more than $(N-1)/2$ evidence-capturing nodes is consistent with each other, it can be considered that the network evidence captured by the more than $(N+1)/2$ evidence-capturing nodes is trusted.

In addition, in practical applications, for example, when capturing a webpage, assume there is a dynamically changing indicator (such as the current time) displayed on the webpage. In this case, when the evidence-capturing nodes respectively capture webpage screenshots not completely synchronous (that is, the timing of capturing webpage screenshots are not completely consistent), it can cause the timing displayed on the webpage screenshots captured by the evidence-capturing nodes to be inconsistent, resulting in inconsistent evidence hashes calculated.

However, the inconsistency in the evidence hashes caused by such reasons is tolerable. Generally, the two webpage screenshots cannot be regarded as screenshots of two different webpages just because the timing shown on the two webpage screenshots are slightly different. In this regard, in some embodiments of the present specification, if the count number of evidence hashes contained in the group with the largest count number is not greater than the first predetermined number, the criteria can be properly adjusted to further determining whether the count number of evidence hashes contained in the group with the largest count number is greater than a second predetermined number (which is less than the first predetermined number). If the determination result is positive, the evidence hash corresponding to the group with the largest count number and the evidence hash corresponding to the group with the second largest count number are both determined as trusted evidence hash.

In other words, the evidence hash in the group with the largest count number and the evidence hash in the group with the second largest count number are both considered trusted. In practice, it is possible to further analyze a similarity between the network evidence corresponding to the evidence hash in the group with the largest count number and the network evidence corresponding to the evidence hash in the group with the second largest count number, if the number of the count number of evidence hashes contained in the group with the largest count number is not greater than the first predetermined number and greater than the second predetermined number. If the similarity is greater than a predetermined similarity, it means that the two are sufficiently similar and can be considered as identical network evidences. Therefore, the evidence hash corresponding to the group with the largest count number and/or the evidence hash corresponding to the group with the second largest count number can be determined as the trusted evidence hash.

In some embodiments of the present specification, if the count number of evidence hashes contained in the group with the largest count number is not greater than the second predetermined number, it means that the authenticity of the evidence capture does not meet the criteria. Therefore, the capture of evidence is restarted, each evidence-capturing node can capture network evidence from the target evidence source again, that is, repeat the steps of the method shown in FIG. 3. It should be noted that a number of times for capturing evidence can be a predetermined number (such as 5). When the evidence-capturing nodes in the blockchain network perform the method shown in FIG. 3 for the predetermined number of times, if the evidence capturing still fails, no further attempts will be made.

In some embodiments of the present specification, if there are two trusted evidence hashes determined, for each of the trusted evidence hashes as determined, each evidence-capturing node can construct ledger data corresponding to the trusted evidence hash based on the trusted evidence hash and record the ledger data. In addition, each evidence-capturing node can also construct ledger data based on the two determined trusted evidence hashes and record the ledger data.

Figure 4:
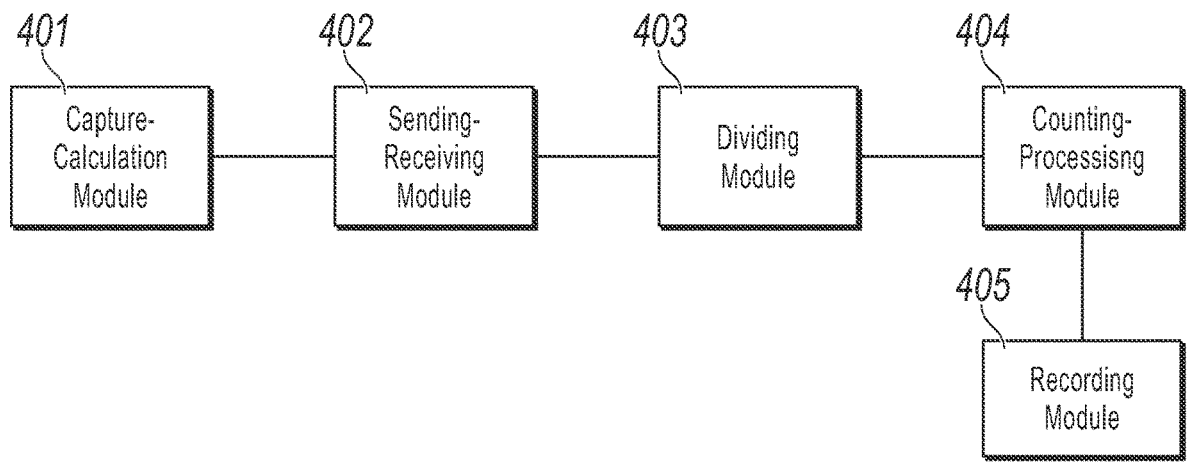
FIG. 4 is a block diagram illustrating an apparatus for recording blockchain ledger data according to an embodiment of the present specification.

FIG. 4 is a block diagram illustrating an apparatus for recording a blockchain ledger data according to an embodiment of the present specification. Nodes of the blockchain network include a plurality of such apparatuses used for capturing network evidence, and the apparatus includes the following components.

A capture-calculation module 401 is configured to capture network evidence from a target evidence source, and calculate an evidence hash of the captured network evidence.

A sending-receiving module 402 is configured to send the calculated evidence hash to other evidence-capturing nodes, and receive evidence hashes sent by other evidence-capturing nodes.

A dividing module 403 is configured to gather identical evidence hashes in all the obtained evidence hashes into the same group, and divide different evidence hashes in all the obtained evidence hashes into different groups.

A counting-processing module 404 is configured to count a count number of evidence hashes in each of the groups, and determine the evidence hash in the group with the largest count number as a trusted evidence hash.

A recording module 405 is configured to construct a ledger data based on the trusted evidence hash as determined and record the ledger data.

The target evidence source includes a target webpage address, and the network evidence includes a webpage screenshot.

The counting-processing module 404 is configured to, if the count number of evidence hashes contained in the group with the largest count number is greater than a first predetermined number, determine the evidence hash corresponding to the group with the largest count number as a trusted evidence hash.

The first predetermined number is (2N+1)/3 or (N+1)/2; and N is the number of evidence-capturing nodes.

The counting-processing module 404 is configured to, if the count number of evidence hashes contained in the group with the largest count number is not greater than the first predetermined number and greater than a second predetermined number, determine both of the evidence hash corresponding to the group with the largest count number and the evidence hash corresponding to the group with the second largest count number as trusted evidence hash, where the second predetermined number is less than the first predetermined number.

The recording module 405 is configured to, for each of the trusted evidence hashes as determined, construct a ledger data corresponding to the trusted evidence hash based on the trusted evidence hash and record the ledger data; or, construct a ledger data based on two determined trusted evidence hashes and record the ledger data.

The recording module 405 is configured to, if the count number of evidence hashes contained in the group with the largest count number is not greater than the second predetermined number, restart to capture network evidence from the target evidence source.

The nodes of the blockchain network also include at least one non-evidence-capturing node.

The sending-receiving module 402 is configured to send the constructed ledger data to the non-evidence-capturing node for recordation.

A blockchain system, including a blockchain network; wherein nodes of the blockchain network include a plurality of evidence-capturing nodes used for capturing network evidence.

Each of the evidence-capturing nodes is configured to capture network evidence from a target evidence source, and calculate an evidence hash of the captured network evidence; send the calculated evidence hash to other evidence-capturing nodes, and receive evidence hashes sent by other evidence-capturing nodes; gather identical evidence hashes in all the obtained evidence hashes into the same group, and divide different evidence hashes in all the obtained evidence hashes into different groups; count a count number of evidence hashes in each of the groups, and determine the evidence hash in the group with the largest count number as a trusted evidence hash; and construct ledger data based on the trusted evidence hash as determined and record the ledger data.

The embodiments of the present specification also provide a computer device, which includes at least a memory, a processor, and a computer program stored in the memory and running on the processor, wherein when the processor executes the program, the processor implements the function of the method as shown in FIG. 3.

Figure 5:
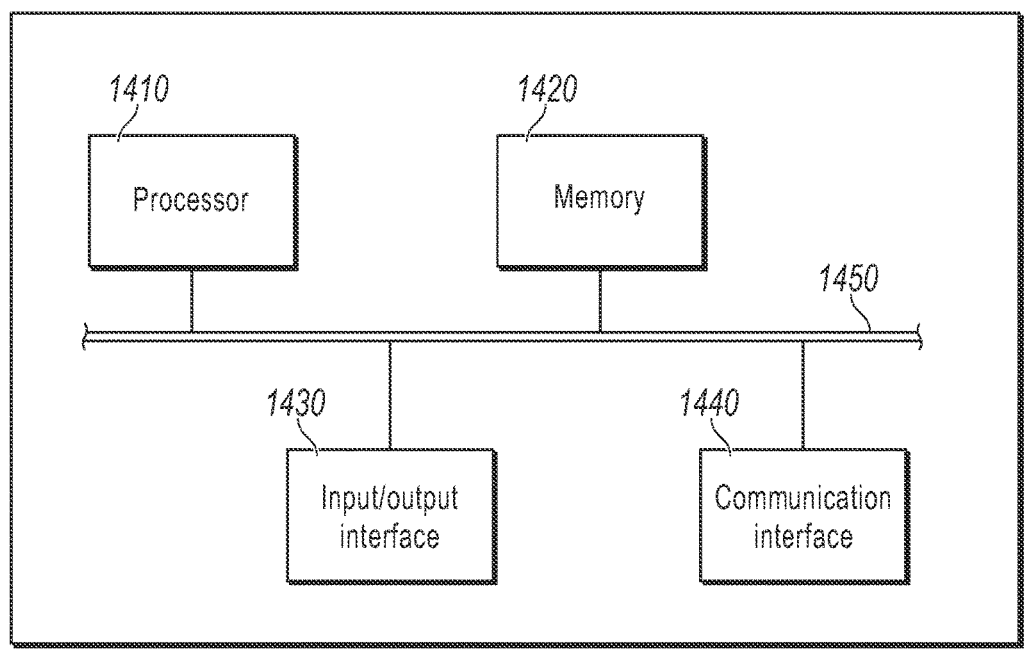
FIG. 5 is a block diagram illustrating a computer device equipped with the apparatus in some embodiments of the present specification.

FIG. 5 shows a more specific hardware structure diagram of a computing device according to some embodiments of the present specification. The device can include a processor 1410, a memory 1420, an input/output interface 1430, a communication interface 1440, and a bus 1450. The processor 1410, the memory 1420, the input/output interface 1430, and the communication interface 1440 implement communication connection between one another in the device via the bus 1450.

The processor 1410 can be implemented by a general Central Processing Unit (CPU), a microprocessor, an Application Specific Integrated Circuit (ASIC), or one or more integrated circuits, to execute related programs to implement the technical solutions provided in some embodiments of the present specification.

The memory 1420 can be implemented in the form of Read Only Memory (ROM), Random Access Memory (RAM), a static storage device, a dynamic storage device, or the like. The memory 1420 can store an operating system and other application programs. When the technical solutions provided in some embodiments of the present specification are implemented by software or firmware, the related program codes are stored in the memory 1420 and invoked and executed by the processor 1410.

The input/output interface 1430 is configured to be connected to input/output modules to implement information input and output. The input/output modules can be configured in the device as components (not shown in the figures), or can be connected externally to a device to provide corresponding functions. An input device can include a keyboard, a mouse, a touch screen, a microphone, various sensors, or the like, and an output device can include a display, a speaker, a vibrator, an indicator light, or the like.

The communication interface 1440 is configured to be connected to a communication module (not shown in the figures) to implement communication interaction between the device and other devices. The communication module can implement communication through wired means (such as USB, network cable, or the like), or through wireless means (such as mobile network, WIFI, Bluetooth, or the like).

The bus 1450 includes a path to transmit information between various components of the device (for example, the processor 1410, the memory 1420, the input/output interface 1430, and the communication interface 1440).

It should be noted that although the above device only is shown to have the processor 1410, the memory 1420, the input/output interface 1430, the communication interface 1440, and the bus 1450, in the specific implementation process, the device can also include other components required to implement normal operation. In addition, those skilled in the art can understand that the above device can also include only the components necessary to implement the solutions of the embodiments of the present specification, and not necessarily include all the components shown in the figures.

The embodiments of the present specification also provide a computer-readable storage medium on which a computer program is stored, and when the program is executed by a processor, the function of the method shown in FIG. 3 is implemented.

The computer-readable medium includes persistent, non-persistent, removable or non-removable medium, which can store information by any method or technology. Information can be computer-readable instructions, data structures, modules of a program, or other data. Examples of computer storage media include, but are not limited to, a parameter random access memory (PRAM), a static random access memory (SRAM), a dynamic random access memory (DRAM), other types of random access memory (RAM), and a read-only memory (ROM), an electrically erasable programmable read-only memory (EEPROM), a flash memory or other memory technologies, a compact disc read-only memory (CD-ROM), a digital versatile disc (DVD) or other optical storage, a cassette magnetic tape, magnetic disk storage, a quantum memory, graphene-based storage media, or other magnetic storage devices or any other non-transmission media can be used to store information that can be accessed by computing devices. Based on the definition in the present specification, computer-readable media does not include transitory computer-readable media (transitory media), such as modulated data signals and carrier waves.

From the description of the above embodiments, those skilled in the art can clearly understand that the embodiments of the present specification can be implemented by means of software plus a necessary general hardware platform. Based on this understanding, the technical solutions of the embodiments of the present specification can be embodied in the form of software products, which can be stored in storage media, such as ROM/RAM, a magnetic disk, an optical disk, etc., include several instructions to make a computer device (which can be a personal computer, a server, or a network device, etc.) to execute the methods described in the various embodiments or some parts of the embodiments of the present specification.

The system, apparatus, module, or unit described in the previous embodiments can be implemented by a computer chip or entity, or can be implemented by using a product with a certain function. A typical implementation device is a computer, and the specific form of the computer can be a personal computer, a laptop computer, a cellular phone, a camera phone, a smart phone, a personal digital assistant, a media player, a navigation device, an email sending and receiving device, a game console, a tablet computer, a wearable device, or a combination of any of these devices.

The various embodiments in the present specification are described in a progressive manner, and the same or similar parts between the various embodiments can be referred to each other. Each embodiment focuses on the differences from other embodiments. In particular, for the method and device embodiments, since they are basically similar to the method embodiments, the description is relatively simple, and the relevant parts can be referred to the part of the description of the method embodiments. The method embodiments described above are only illustrative. The modules described as separate components can or cannot be physically separated. When implementing the solutions of the embodiments of the present specification, the functions of the modules can be in the same or multiple software and/or hardware implementations. Some or all of the modules can also be selected according to actual needs to achieve the objectives of the solutions of the embodiments. Those of ordinary skill in the art can understand and implement it without creative work.

The above are only specific implementations of the embodiments of the present specification. It should be pointed out that for those of ordinary skill in the art, without departing from the principle of the embodiments of the present specification, some improvements and modifications can be made. Such improvements and modifications should also be regarded as be within the protection scope of the embodiments of the present specification.

What is claimed is:

1. A computer-implemented method, comprising:
    capturing, by a first evidence-capturing node of a plurality of evidence-capturing nodes of a blockchain network comprising a plurality of nodes, network evidence from a target evidence source;
    calculating, by the first evidence-capturing node, a first evidence hash of the captured network evidence;
    sending, by the first evidence-capturing node, the first evidence hash to other evidence-capturing nodes in the plurality of evidence-capturing nodes;
    receiving, from the other evidence-capturing nodes, additional evidence hashes;
    generating, for each set of matching evidence hashes from a plurality of evidence hashes comprising the first evidence hash and the additional evidence hashes, an evidence hash group that includes the set of matching evidence hashes;
    determining, for each evidence hash group, a count number of evidence hashes in the evidence hash group;
    identifying a given evidence hash group having a largest count number;
    determining, as a trusted evidence hash, a given evidence hash corresponding to the matching evidence hashes of the given evidence hash group;
    constructing, by the first evidence-capturing node, ledger data based on the trusted evidence hash; and
    recording, by the first evidence-capturing node, the ledger data.

2. The computer-implemented method of claim 1, wherein the target evidence source comprises a target webpage address and the network evidence comprises a webpage screenshot.

3. The computer-implemented method of claim 1, wherein determining, as the trusted evidence hash, the given evidence hash corresponding to the matching evidence hashes of the given evidence hash group comprises, when the count number of evidence hashes in the given evidence hash group having the largest count number is greater than a first predetermined number, determining the given evidence hash corresponding to the matching evidence hashes of the given evidence hash group as the trusted evidence hash.

4. The computer-implemented method of claim 3, wherein the first predetermined number is $(2N+1)/3$ or $(N+1)/2$, and wherein N is a number of evidence-capturing nodes in the plurality of evidence-capturing nodes.

5. The computer-implemented method of claim 3, further comprising, when the count number of evidence hashes contained in the given evidence hash group is not greater than the first predetermined number and greater than a second predetermined number, determining both of the given evidence hash corresponding to the given evidence hash group and the evidence hash corresponding to a second evidence hash group with a second largest count number as trusted evidence hashes, where the second predetermined number is less than the first predetermined number.

6. The computer-implemented method of claim 5, wherein constructing the ledger data based on the trusted evidence hash comprises:
for each of the trusted evidence hashes, constructing the ledger data corresponding to the trusted evidence hash based on the trusted evidence hash; or,
constructing the ledger data based on both of the trusted evidence hashes.

7. The computer-implemented method of claim 5, further comprising, when the count number of evidence hashes contained in the group with the largest count number is not greater than the second predetermined number, restarting to capture network evidence from the target evidence source.

8. The computer-implemented method of claim 1, wherein the nodes of the blockchain network further comprise at least one non-evidence-capturing node and the method further comprises sending the ledger data to the non-evidence-capturing node for recordation.

9. A non-transitory, computer-readable medium storing one or more instructions executable by a computer system to perform operations comprising:
capturing, by a first evidence-capturing node of a plurality of evidence-capturing nodes of a blockchain network comprising a plurality of nodes, network evidence from a target evidence source;
calculating, by the first evidence-capturing node, a first evidence hash of the captured network evidence;
sending, by the first evidence-capturing node, the first evidence hash to other evidence-capturing nodes in the plurality of evidence-capturing nodes;
receiving, from the other evidence-capturing nodes, additional evidence hashes;
generating, for each set of matching evidence hashes from a plurality of evidence hashes comprising the first evidence hash and the additional evidence hashes, an evidence hash group that includes the set of matching evidence hashes;
determining, for each evidence hash group, a count number of evidence hashes in the evidence hash group;
identifying a given evidence hash group having a largest count number;
determining, as a trusted evidence hash, a given evidence hash corresponding to the matching evidence hashes of the given evidence hash group;
constructing, by the first evidence-capturing node, ledger data based on the trusted evidence hash; and
recording, by the first evidence-capturing node, the ledger data.

10. The non-transitory, computer-readable medium of claim 9, wherein the target evidence source comprises a target webpage address and the network evidence comprises a webpage screenshot.

11. The non-transitory, computer-readable medium of claim 9, wherein determining, as the trusted evidence hash, the given evidence hash corresponding to the matching evidence hashes of the given evidence hash group comprises, when the count number of evidence hashes in the given evidence hash group having the largest count number is greater than a first predetermined number, determining the given evidence hash corresponding to the matching evidence hashes of the given evidence hash group as the trusted evidence hash.

12. The non-transitory, computer-readable medium of claim 11, wherein the first predetermined number is $(2N+1)/3$ or $(N+1)/2$, and wherein N is a number of evidence-capturing nodes in the plurality of evidence-capturing nodes.

13. The non-transitory, computer-readable medium of claim 11, wherein the operations comprise, when the count number of evidence hashes contained in the given evidence hash group is not greater than the first predetermined number and greater than a second predetermined number, determining both of the given evidence hash corresponding to the given evidence hash group and the evidence hash corresponding to a second evidence hash group with a second largest count number as trusted evidence hashes, where the second predetermined number is less than the first predetermined number.

14. The non-transitory, computer-readable medium of claim 13, wherein constructing the ledger data based on the trusted evidence hash comprises:
for each of the trusted evidence hashes, constructing the ledger data corresponding to the trusted evidence hash based on the trusted evidence hash; or,
constructing the ledger data based on both of the trusted evidence hashes.

15. The non-transitory, computer-readable medium of claim 13, wherein the operations comprise, when the count number of evidence hashes contained in the group with the largest count number is not greater than the second predetermined number, restarting to capture network evidence from the target evidence source.

16. The non-transitory, computer-readable medium of claim 9, wherein the nodes of the blockchain network further comprise at least one non-evidence-capturing node and the operations further comprise sending the ledger data to the non-evidence-capturing node for recordation.

17. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
capturing, by a first evidence-capturing node of a plurality of evidence-capturing nodes of a blockchain network comprising a plurality of nodes, network evidence from a target evidence source;

calculating, by the first evidence-capturing node, a first evidence hash of the captured network evidence;

sending, by the first evidence-capturing node, the first evidence hash to other evidence-capturing nodes in the plurality of evidence-capturing nodes;

receiving, from the other evidence-capturing nodes, additional evidence hashes;

generating, for each set of matching evidence hashes from a plurality of evidence hashes comprising the first evidence hash and the additional evidence hashes, an evidence hash group that includes the set of matching evidence hashes;

determining, for each evidence hash group, a count number of evidence hashes in the evidence hash group;

identifying a given evidence hash group having a largest count number;

determining, as a trusted evidence hash, a given evidence hash corresponding to the matching evidence hashes of the given evidence hash group;

constructing, by the first evidence-capturing node, ledger data based on the trusted evidence hash; and recording, by the first evidence-capturing node, the ledger data.

18. The computer-implemented system of claim 17, wherein the target evidence source comprises a target webpage address and the network evidence comprises a webpage screenshot.

19. The computer-implemented system of claim 17, wherein determining, as the trusted evidence hash, the given evidence hash corresponding to the matching evidence hashes of the given evidence hash group comprises, when the count number of evidence hashes in the given evidence hash group having the largest count number is greater than a first predetermined number, determining the given evidence hash corresponding to the matching evidence hashes of the given evidence hash group as the trusted evidence hash.

20. The computer-implemented system of claim 19, wherein the first predetermined number is (2N+1)/3 or (N+1)/2, and wherein N is a number of evidence-capturing nodes in the plurality of evidence-capturing nodes.

21. The computer-implemented system of claim 19, wherein the operations comprise, when the count number of evidence hashes contained in the given evidence hash group is not greater than the first predetermined number and greater than a second predetermined number, determining both of the given evidence hash corresponding to the given evidence hash group and the evidence hash corresponding to a second evidence hash group with a second largest count number as trusted evidence hashes, where the second predetermined number is less than the first predetermined number.

22. The computer-implemented system of claim 21, wherein constructing the ledger data based on the trusted evidence hash comprises:

for each of the trusted evidence hashes, constructing the ledger data corresponding to the trusted evidence hash based on the trusted evidence hash; or, constructing the ledger data based on both of the trusted evidence hashes.

23. The computer-implemented system of claim 21, wherein the operations comprise, when the count number of evidence hashes contained in the group with the largest count number is not greater than the second predetermined number, restarting to capture network evidence from the target evidence source.

24. The computer-implemented system of claim 17, wherein the nodes of the blockchain network further comprise at least one non-evidence-capturing node and the operations further comprise sending the ledger data to the non-evidence-capturing node for recordation.

* * * * *